(12) United States Patent
Nelson et al.

(10) Patent No.: US 11,027,529 B2
(45) Date of Patent: Jun. 8, 2021

(54) JOINT SURFACE COATINGS FOR CERAMIC COMPONENTS

(71) Applicant: Rolls-Royce Corporation, Indianapolis, IN (US)

(72) Inventors: Scott Nelson, Carmel, IN (US); Sean E. Landwehr, Avon, IN (US); Raymond Ruiwen Xu, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 15/628,148

(22) Filed: Jun. 20, 2017

(65) Prior Publication Data

US 2017/0368803 A1    Dec. 28, 2017

Related U.S. Application Data

(60) Provisional application No. 62/354,027, filed on Jun. 23, 2016.

(51) Int. Cl.
*B32B 18/00* (2006.01)
*C04B 37/00* (2006.01)
(Continued)

(52) U.S. Cl.
CPC .............. *B32B 18/00* (2013.01); *B32B 15/04* (2013.01); *C04B 35/565* (2013.01); *C04B 37/00* (2013.01);
(Continued)

(58) Field of Classification Search
None
See application file for complete search history.

(56) References Cited

U.S. PATENT DOCUMENTS

| 5,858,181 A | 1/1999 | Jindal et al. |
| 6,884,511 B1 | 4/2005 | Rossing et al. |
| 7,989,086 B2 | 8/2011 | Warrier et al. |
| 8,211,524 B1 | 7/2012 | Gonzalez et al. |

(Continued)

FOREIGN PATENT DOCUMENTS

WO    WO-2014164859 A2 * 10/2014    ......... C04B 41/5133

OTHER PUBLICATIONS

Extended Search Report from counterpart European Application No. 17172477.6, dated Nov. 13, 2017, 7 pp.

(Continued)

*Primary Examiner* — Humera N. Sheikh
*Assistant Examiner* — Elizabeth D Ivey
(74) *Attorney, Agent, or Firm* — Shumaker & Sieffert, P.A.

(57) ABSTRACT

An example article may include a component, a substrate including a first ceramic, a joining layer between the component and the substrate, and a joint surface coating between the substrate and the joining layer. The joint surface coating may include a diffusion barrier layer including a second ceramic material, and a compliance layer including at least one of a metal or a metalloid. An example technique may include holding a first joining surface of a coated component adjacent a second joining surface of a second component. The example technique may further include heating at least one of the coated component, the second component, and a braze material, and brazing the coated component by allowing the braze material to flow in a region between the first joining surface and the second joining surface.

16 Claims, 5 Drawing Sheets

(51) Int. Cl.
  *C04B 37/02* (2006.01)
  *C04B 37/04* (2006.01)
  *B32B 15/04* (2006.01)
  *C04B 35/565* (2006.01)
  *C04B 41/45* (2006.01)

(52) U.S. Cl.
  CPC .......... *C04B 37/003* (2013.01); *C04B 37/005* (2013.01); *C04B 37/023* (2013.01); *C04B 37/025* (2013.01); *C04B 37/045* (2013.01); *C04B 41/4501* (2013.01); *C04B 2235/5244* (2013.01); *C04B 2235/96* (2013.01); *C04B 2235/9607* (2013.01); *C04B 2237/08* (2013.01); *C04B 2237/083* (2013.01); *C04B 2237/12* (2013.01); *C04B 2237/122* (2013.01); *C04B 2237/16* (2013.01); *C04B 2237/30* (2013.01); *C04B 2237/341* (2013.01); *C04B 2237/343* (2013.01); *C04B 2237/36* (2013.01); *C04B 2237/363* (2013.01); *C04B 2237/365* (2013.01); *C04B 2237/368* (2013.01); *C04B 2237/38* (2013.01); *C04B 2237/52* (2013.01); *C04B 2237/58* (2013.01); *C04B 2237/59* (2013.01); *C04B 2237/708* (2013.01); *C04B 2237/72* (2013.01); *C04B 2237/84* (2013.01)

(56) References Cited

U.S. PATENT DOCUMENTS

| 8,763,883 | B2 | 7/2014 | Chaumat et al. |
| 2003/0157360 | A1 | 8/2003 | Shinkai et al. |
| 2005/0145679 | A1 | 7/2005 | Beyer et al. |
| 2005/0255648 | A1* | 11/2005 | Bhatia ................ C04B 41/4826 438/218 |
| 2006/0006212 | A1* | 1/2006 | Thebault ................ B23K 1/08 228/121 |
| 2008/0305356 | A1* | 12/2008 | Weil ...................... C04B 37/006 428/640 |
| 2013/0022836 | A1 | 1/2013 | Easley et al. |
| 2015/0083787 | A1 | 3/2015 | Stuer et al. |
| 2016/0153288 | A1 | 6/2016 | Luthra |

OTHER PUBLICATIONS

Response to Examination Report dated May 14, 2020, from counterpart European Application No. 17172477.6, filed Sep. 4, 2020, 48 pp.

Examination Report from counterpart European Application No. 17172477.6 dated May 14, 2020, 6 pp.

Examination Report from counterpart European Application No. 17172477.6, dated Jan. 29, 2021, 7 pages.

* cited by examiner

JOINT SURFACE COATINGS FOR CERAMIC COMPONENTS

This application claims the benefit of U.S. Provisional Application No. 62/354,027 filed Jun. 23, 2016, which is incorporated herein by reference in its entirety.

TECHNICAL FIELD

The present disclosure generally relates to joining ceramic components, for example, ceramic matrix composite components.

BACKGROUND

Ceramic materials may be used for aerospace, automotive, aviation, and industrial applications due to their desirable high temperature properties. A ceramic matrix composite (CMC) is a fiber-reinforced ceramic structure that features ceramic matrices toughened by incorporating reinforcement materials, such as fibers. Industrial components may be fabricated by joining ceramic or CMC components to other components. For example, components of high temperature mechanical systems, such as gas turbine engines, may include ceramic or CMC subcomponents.

SUMMARY

In some examples, the disclosure describes an example article that includes a component, a substrate including a first ceramic, a joining layer between the component and the substrate, and a joint surface coating between the substrate and the joining layer. The joint surface coating may include a diffusion barrier layer including a second ceramic material, and a compliance layer including at least one of a metal or a metalloid. The compliance layer may be between the diffusion barrier layer and the substrate.

In some examples, the disclosure describes an example technique that includes applying a compliance layer including at least one of a metal or a metalloid to a major surface of a substrate including a first ceramic. The example technique further includes applying a diffusion barrier layer comprising a second ceramic on the compliance layer.

In some examples, the disclosure describes an example technique that includes holding a first joining surface of a coated component including a substrate adjacent a second joining surface of a second component. The substrate includes a first ceramic coated with a joint surface coating. The joint surface coating includes a diffusion barrier layer and a compliance layer. The diffusion barrier layer includes a second ceramic. The compliance layer includes at least one of a metal or a metalloid. The compliance layer is between the diffusion barrier layer and the substrate. The example technique further includes heating at least one of the coated component, the second component, and a braze material. The example technique further includes brazing the coated component by allowing the braze material to flow in a region between the first joining surface and the second joining surface.

The details of one or more examples are set forth in the accompanying drawings and the description below. Other features, objects, and advantages will be apparent from the description and drawings, and from the claims.

DETAILED DESCRIPTION

The disclosure describes example articles including joint surface coatings on ceramic substrates, example techniques for applying joint surface coatings, and example techniques for joining coated ceramic components to other components. Components including ceramic or ceramic matrix composite (CMC) substrates may be joined in the course of industrial techniques, for example, manufacturing or repair. The joining may include suitable joining techniques, for example, brazing component surfaces with a braze. Prior to the joining, the components may be machined to prepare the surface for the joining, for example, by allowing substantially even or uniform application of the braze. However, some regions of the machined surfaces may include impurities or surface features that may prevent even or uniform application of braze materials, or may disallow the application of braze materials. For example, localized areas of machined surfaces of CMC substrates may include compounds or impurities that prevent braze metals, such as silicon-based braze alloys, from properly wetting and adhering to the CMC. In contrast, other localized areas of the machined CMC surfaces may allow molten braze alloy or constituent elements of the braze alloy to overflow and diffuse excessively into the CMC substrate from the surface.

According to the example articles and techniques described in the disclosure, a substrate may be coated with a joint surface coating that may include a barrier layer including one or more ceramics and a compatibility layer including one or more metals or metalloids between the barrier layer and the substrate. The example joint surface coating may provide one or more benefits, including enhancing braze wetting and adhesion, reducing or substantially preventing undesirable flow or diffusion of braze material into the bulk of the substrate, reducing or substantially preventing flow or diffusion of species from the substrate into the braze material, providing mechanical compliance for the joint system, or combinations thereof.

Figure 1A:
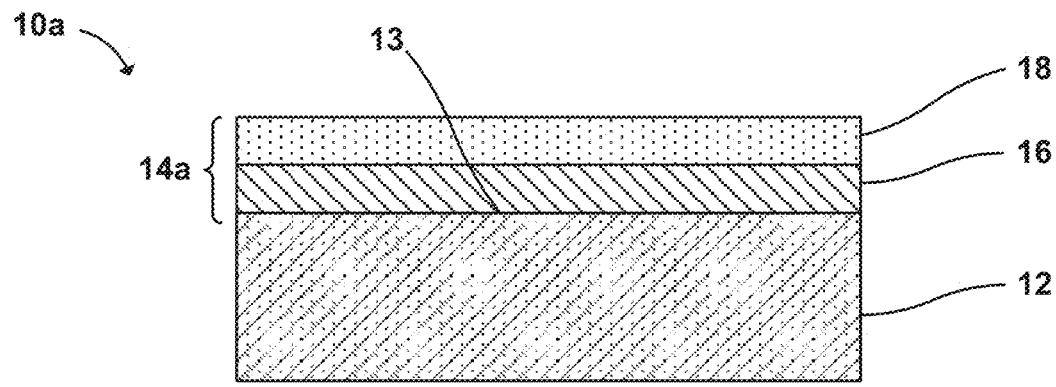
FIG. 1A is a conceptual and schematic cross-sectional block diagram illustrating an example article including a substrate and a multilayer coating.

FIG. 1A is a conceptual and schematic cross-sectional block diagram illustrating an example article 10a including a substrate 12 and a joint surface coating 14a. Substrate 12 may include a first ceramic. For example, substrate 12 may include a ceramic material; a ceramic composite; a CMC, for example, a ceramic fiber-reinforced CMC; or a composite including ceramic and one or more of glass, metal, or polymer. Example ceramic materials may include, for example, silicon carbide (SiC); silicon nitride ($Si_3N_4$); alumina ($Al_2O_3$); aluminosilicate; silica ($SiO_2$); transition metal carbides, silicides, or both (e.g. WC, $Mo_2C$, TiC, MoSi$_2$, NbSi$_2$, TiSi$_2$); or the like. In some examples, substrate 12 additionally may include silicon metal, carbon, or the like. In some examples, substrate 12 may include mixtures of two or more of SiC, Si$_3$N$_4$, Al$_2$O$_3$, aluminosilicate, silica, silicon metal, carbon, or the like.

In examples in which substrate 12 includes a CMC, substrate 12 includes a matrix material and a reinforcement material. The matrix material includes a ceramic material alone or in combination with a metal, such as, for example, SiC alone or in combination with silicon metal, or other ceramics described herein. The CMC may further include a continuous or discontinuous reinforcement material. For example, the reinforcement material may include discontinuous whiskers, platelets, fibers, or particulates. In some examples, the reinforcement material may include a continuous monofilament or multifilament weave. In some examples, the reinforcement material may include SiC, C, other ceramic materials described herein, or the like. In some examples, substrate 12 includes a SiC—SiC ceramic matrix composite.

Substrate 12 may include a surface region or a major surface 13 on which joint surface coating 14a is applied. For example, substrate 12 may have a flat, substantially flat, curved, or compound surface region. Joint surface coating 14a may be disposed on major surface 13 of substrate 12. In some examples, joint surface coating 14a may be disposed evenly having a substantially uniform thickness along major surface 13 of substrate 12. In other examples, joint surface coating 14a may be deposited in a predetermined pattern, for example, a grid, on major surface 13 of substrate 12, by masking or another patterning technique.

Joint surface coating 14a may include a diffusion barrier layer 18 adjacent major surface 13 of substrate 12 and a compliance layer 16 between diffusion barrier layer 18 and substrate 12. Diffusion barrier layer 18 may include a second ceramic material. In some examples, diffusion barrier layer 18 may prevent, inhibit, or reduce the diffusion of one or more of chemical species, for example, atoms, molecules, compounds, or ions thereof to or from substrate 12 across diffusion barrier layer 18. For example, the second ceramic material in diffusion barrier layer 18 may be effective to prevent, inhibit or reduce diffusion or migration of chemical species originating from substrate 12, or from an article adjacent substrate 12 or diffusion barrier 18. In some examples, diffusion barrier layer 18 may prevent the diffusion or migration of at least one of SiC, Si$_3$N$_4$, or WC, braze transition metals such as titanium, tantalum, aluminum, nickel, cobalt, chromium, vanadium, zirconium, niobium, or zinc, or, contaminating elements from the substrate, such as iron, boron, or oxides.

The second ceramic material may include any ceramic material that reduces diffusion of one or more selected components across diffusion barrier layer 18. In some examples, the second ceramic material may include silicon carbide. In some examples, diffusion barrier layer 18 may consist of silicon carbide. In some examples, diffusion barrier layer 18 may consist essentially of a layer of silicon carbide having a substantially uniform thickness of about 10 nm. A diffusion barrier layer consisting essentially of silicon carbide may prevent the diffusion or migration of species with atomic radii larger than 87 pm (e.g. transition metals, alkali metals, alkali earth metals, and most metalloids). Other bonded barrier layers that have a metallically-bonded crystallographic structure may have a higher solid solubility for the potential contaminating constituents. In some examples, the second ceramic material in diffusion barrier layer 18 may be the same as the first ceramic material in substrate 12, while in other examples, the second ceramic material in diffusion barrier layer 18 may be different than the first ceramic material in substrate 12. In some examples, a composition of the first ceramic material may be substantially the same as a composition of the second ceramic material, while including one or more additives, for example, at least one predetermined metal or metalloid element or alloy. In some examples, diffusion barrier layer 18 may include carbon. In some examples, diffusion barrier layer 18 may not include a ceramic, and may consist of carbon.

Joint surface coating 14a also includes compliance layer 16. Compliance layer 16 may include at least one of a metal or a metalloid (e.g., at least one metal, at least one metalloid, or at least one metal and at least one metalloid). Compliance layer 16 reduces or substantially prevents damage caused by a thermal expansion differential between substrate 12 and diffusion barrier layer 18. For example, compliance layer 16 may have a coefficient of thermal expansion having a magnitude between respective magnitudes of coefficients of thermal expansion of substrate 12 and of diffusion barrier layer 18. Selecting such an intermediate coefficient of thermal expansion may reduce or smoothen size change gradients across respective layers, ultimately reducing dimensional mismatch and reducing stress exerted on joint surface coating 14a. In some examples, compliance layer 16 may at least one of prevent wear, reduce fragility, or preserve integrity of diffusion barrier layer 18. For example, compliance layer 16 may assist in conforming barrier layer 18 to the geometry of substrate 12, or in uniformly adhering barrier layer 18 to substrate 12. In some examples, compliance layer 16 may reduce stress applied on diffusion barrier layer 18 by substrate 12 or by a surface of an object. In some examples, compliance layer 16 may help diffusion barrier layer 18 survive thermal, pressure, or stress cycling, for example, by dissipating heat flow and or stresses to prevent localized build-up of heat or stress that may damage diffusion barrier layer 18. Compliance layer 16 may include any composition that performs the functions described herein and adheres to substrate 12 and barrier layer 18. In some examples, compliance layer 16 may include silicon. In some examples, compliance layer 16 may consist of silicon. A compliance layer consisting essentially of silicon may provide a layer that beneficially bonds to many of the other barrier layers and bonding materials. In some examples, compliance layer 16 may consist essentially of a layer of silicon having a substantially uniform thickness of about 10 nm. In some examples, the composition of compliance layer 16 may include at least one component, for example, a metal or a metalloid, that is also present in substrate 12. For example, substrate 12 and compliance layer 16 may each include silicon.

In some examples, joint surface coating 14a may be applied over other coatings that may already be present on substrate 12, for example, environmental barrier coatings (EBC) or thermal barrier coatings (TBC).

Joint surface coating 14a may prevent contamination of substrate 12 and promote wetting of substrate 12 with a braze material or other joining material configured to join substrate 12 to another article. For example, diffusion barrier layer 18 may reduce diffusion of chemical species between substrate 12 and an adjacent article, and compliance layer 16 may provide mechanical compliance to joint surface coating 14a by reducing thermal or other stresses resulting from thermal or mechanical cycling that may result in cracks or damage. Thus, joint surface coating 14a may provide a better joint between substrate 12 and an article to which component 12 is joined.

Figure 1B:
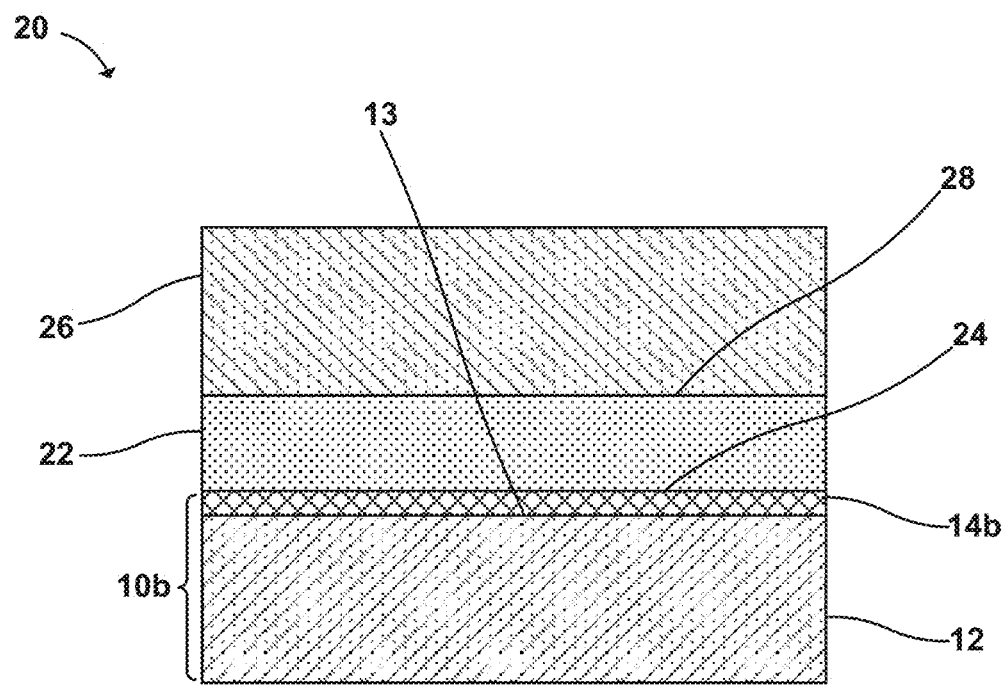
FIG. 1B is a conceptual and schematic cross-sectional block diagram illustrating an example article including a coated component joined to a second component.

For example, FIG. 1B is a conceptual and schematic cross-sectional block diagram illustrating an example article 20 including a coated component 10b joined to a second component 26 by a joining layer 22. Coated component 10b includes substrate 12 and a joint surface coating 14b, and may define a first joining surface 24. In some examples, the composition of joint surface coating 14b may be substantially similar to any of the compositions of joint surface coating 14a described with reference to FIG. 1A, and a major surface of joint surface coating 14b may be first joining surface 24. Second component 26 defines a second joining surface 28, which contacts joining layer 22.

FIG. 1B illustrates first and second joining surfaces 24 and 28, and first major surface 13, as substantially flat surfaces. In other examples, first and second joining surfaces 24 and 28, and first major surface 13 may define other, more complex shapes, including, for example, simple or complex curves, overhangs, undercuts, or the like. First and second joining surfaces 24 and 28 may define any kind of joint geometry, including, for example, at least one of a bridle joint, a butt joint, a miter joint, a dado joint, a groove joint, a tongue and groove joint, a mortise and tenon joint, a birdsmouth joint, a halved joint, a biscuit joint, a lap joint, a double lap joint, a dovetail joint, or a splice joint. Further, first joining surface 24 and second joining surface 28 may have any complementary or corresponding geometries to define the joint geometry. For example, for a mortise and tenon joint, one of the first and second joining surfaces 24 and 28 may define a mortise (a cavity) and the other of the first and second joining surface 24 and 28 may define a tenon (a projection that inserts into the mortise). As another example, for a splice joint, one of the first and second joining surfaces 24 and 28 may define a half lap, a bevel lap, or the like, and the other of the first and second joining surfaces 24 and 28 may define a complementary half lap bevel lap, or the like.

In some examples, joint surface coating 14b may include additional layers compared to joint surface coating 14a illustrated in FIG. 1, as described with reference to FIGS. 1C and 1D.

Second component 26 may include a substrate including one or more of a metal, glass, polymer, or a substrate having a composition substantially similar to example compositions described with reference to substrate 12 of FIG. 1A. Second component 26 may define second joining surface 28. In some examples, second joining surface 28 may be a major surface of second component 26, as shown in FIG. 1B. In some examples, a joint surface coating (not shown) may be applied to a major surface of second component 26, and a major surface of the joint surface coating of second component 26 may be the second joining surface 28. In some examples, the joint surface coating on second component 26 may include one or more layers according to examples of joint surface coating described with reference to FIGS. 1A, 1C, and 1D. In some examples, major surface 28 may be a machined or a polished surface, or a surface otherwise prepared for joining second component 28 to coated component 10.

For example, joining layer 22 may contact second joining surface 28 of second component 26 to join second component 26 to first joining surface 24 of coated component 12.

Joining layer 22 may include a joining material that is compatible with at least one of first joining surface 24 and second joining surface 28. For example, joining layer 22 may include a braze or a weld.

In some examples, joining layer 22 may be formed by brazing a braze material on between first joining surface 24 and second joining surface 28. The braze material may originally be in the form of a powder, a paste, a preform, or any other form that may be applied on or between first joining surface 24 and second joining surface 28. After brazing, the braze material may transform to a relatively rigid or solid layer.

The composition of the braze material may be selected based on the composition of at least one of component 10, or a braze compatibility layer, and second component 26. For example, a silicon-based braze material may be used to join a silicon-based ceramic/CMC to another silicon-based ceramic/CMC. In some examples, the braze alloy may include a silicon alloy. In some examples, joining layer 22 may consist essentially of a silicon alloy. For example, any suitable silicon-based alloy may be used. A silicon-based alloy includes a greater amount of silicon than any other single alloying component present. For example, in the case of a silicon-based alloy with silicon, Ti, and Zr in the composition, silicon may be present in a greater amount that the Ti individually and also in a greater amount that the Zr individually, while the combined total of Ti and Zr may or may not be greater than the amount of silicon. Example alloying components include Ti, Co, C, Mo, B, V, Cr, Cu, Nb, and Zr. Examples of a silicon-based alloy include Si—Ti, Si—Co, Si—Ti—C, and combinations thereof.

In some examples, the braze alloy powder may include one or more high-melting point materials in addition to the Si-based alloy(s). For example, the braze alloy may include one or more components having a melting-point greater than about 1400° C. in addition to the Si-based alloy. The addition of such high melting point components may increase the amounts of stable phases, such as, e.g., SiC, in joining layer 22 formed from the braze material.

In some examples, the braze material may include one or more of a binder, a filler, and a medium, for example, an aqueous medium or a suitable solvent or carrier. For example, the braze material may be in the form of a tape or preform, and the binder may bind particles or powder of the braze alloy in the tape or preform. In some examples, the binder may include an organic binder, and the organic binder may include at least one of a high char yielding component or a preceramic polymer. In some examples, the high char yielding component may include a phenol or furan based organic material, such as furfuryl alcohol or phenol formaldehyde. The high char yielding component may act as a carbon source during the brazing technique. In some examples, the preceramic polymer includes a polycarbosilane, which may be a precursor to SiC.

In some examples, the braze material may include the filler material, and the filler material may include a ceramic material, one or more transition metals (e.g., titanium, cobalt, molybdenum, nickel, vanadium, chromium, copper, tantalum, niobium or yttrium, zirconium), carbon, or the like. Example ceramic materials for the filler material include transition metal carbides (e.g., molybdenum carbide, cobalt carbide, titanium carbide, tungsten carbide, vanadium carbide, niobium carbide, tantalum carbide, zirconium carbide or chromium carbide), transition metal borides (e.g., molybdenum boride, cobalt boride, titanium boride, tungsten boride, vanadium boride, niobium boride, tantalum boride, or chromium boride), transition metal silicides (e.g., titanium silicide, yttrium silicide, molybdenum silicide, or tungsten silicide), and SiC. In some examples, the filler material may include a mixture of at least two of these materials, such as SiC and a transition metal, SiC and carbon, or the like. In some examples, the filler material may be in the form of a powder, particulate, fiber, sheet, or the like. In some examples, the filler material may be mixed, suspended, or dispersed in a solid carrier, such as a polymer. In some examples, the filler material may include combinations of two or more of these forms, e.g., a fiber and a powder. For example, the braze material may include a powder mixed in a polymer carrier. In some examples, the braze material may be a solid material including a filter and a metal or alloy.

Joint surface coating 14b may promote the uniform application of joining layer 22, for example, over major surface 13 of substrate 12, and may prevent the diffusion of chemical species between joining layer 22 and substrate 12, or between second component 26 and substrate 22.

While joint surface coating 14a of FIG. 1A includes one compliance layer 16 and one diffusion barrier layer 18, in some examples, an example joint surface coating may include additional layers. For example, FIG. 1C is a conceptual and schematic cross-sectional block diagram illustrating an example article 10c including substrate 12 and a joint surface coating 14c, where joint surface coating 14b includes two diffusion barrier layers and two compliance layers. In some examples, joint surface coating 14c may include a first diffusion barrier layer 18a adjacent substrate 12, and a first compliance layer 16a disposed between first diffusion barrier layer 18a and substrate 12. Joint surface coating 14c may include a second diffusion barrier layer 18b and a second compliance layer 16b, with second compliance layer 16b disposed between second diffusion barrier layer 18b and first diffusion barrier layer 18a. In some examples, the composition of first and second diffusion barrier layers 18a and 18b may be the same or substantially similar to any of the compositions of diffusion barrier layer 18 of FIG. 1A. In some examples, the composition of first and second diffusion barrier layers 18a and 18b may be the same, substantially the same, or different. For example, one or both first and second diffusion barrier layers 18a and 18b may include the second ceramic material. In some examples, only one of first and second diffusion barrier layers 18a and 18b may include the second ceramic material.

In some examples, the composition of first and second compliance layers 16a and 16b may be the same or substantially similar to any of the compositions of compliance layer 16 of FIG. 1A. In some examples, the composition of first and second compliance layers 16a and 16b may be the same, substantially the same, or different. For example, one or both of first and second compliance layers 16a and 16b may include the same or different metal or metalloid. In some examples, only one of first and second compliance layers 16a and 16b may include silicon. In some examples, both first and second compliance layers 16a and 16b may include silicon.

Figure 1C:
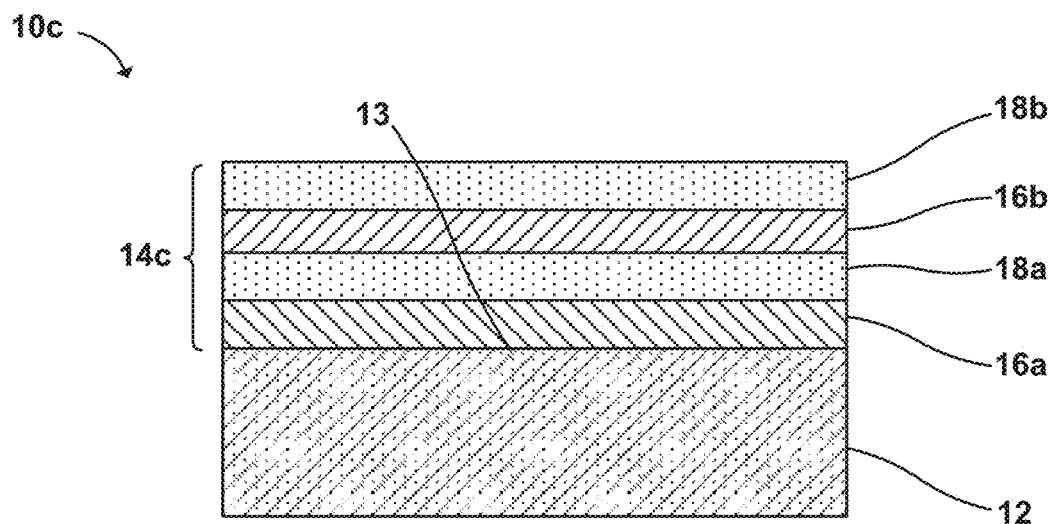
FIG. 1C is a conceptual and schematic cross-sectional block diagram illustrating an example article including a substrate and a multilayer coating.
Figure 1D:
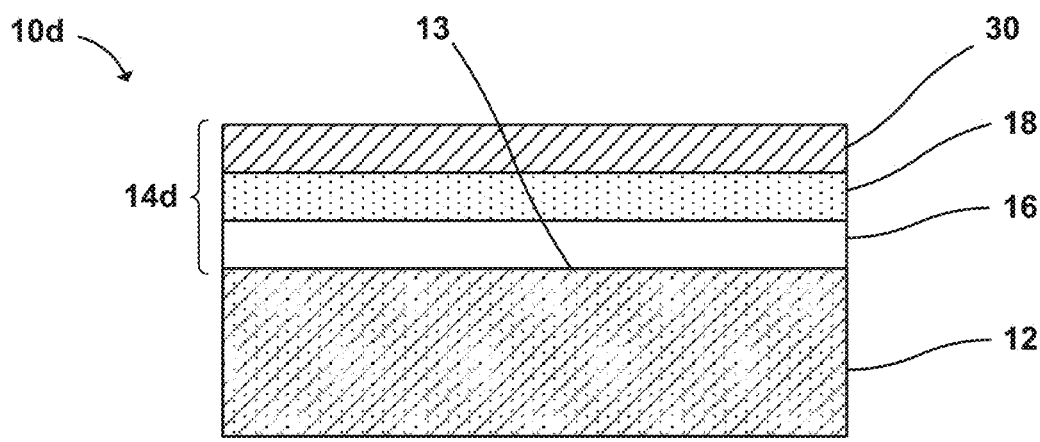
FIG. 1D is a conceptual and schematic cross-sectional block diagram illustrating an example article including a substrate and a multilayer coating.

While in the example shown in FIG. 1C, joint surface coating 14b includes two compliance layers and two diffusion barrier layers, in some examples, joint surface coating 14c may include at least one compliance layer (e.g., one, two, or more than two compliance layers), and independently include at least one diffusion barrier layer (e.g., one, two, or more diffusion barrier layers). For example, joint surface coating 14c may include a plurality of alternating diffusion barrier layers and compliance layers. Further, in some examples, one, two, or more than two diffusion barrier layers may be disposed between successive compliance layers. In some examples, one, two, or more than two compliance layers may be disposed between successive diffusion barrier layers. In some examples, each compliance layer in joint surface coating 14c may have the same or substantially the same composition, while in other examples, at least one compliance layer may have a different composition than at least one other compliance layer. In some examples, each diffusion barrier layer in joint surface coating 14c may have the same or substantially the same composition, while in other examples, at least one diffusion barrier layer may have a different composition that at least one other diffusion barrier layer.

Including multiple diffusion barrier layers may provide better mechanical compliance to joint surface coating 14c, by avoiding stresses that may develop in single diffusion barriers. For example, increasing the thickness of a single diffusion barrier layer may reduce diffusion of chemical species, by requiring the chemical species to migrate or diffuse across the increased thickness of the single diffusion barrier. However, increasing the thickness of the single diffusion barrier may lead to increased thermal or mechanical stresses, whereby thicker single diffusion barriers may be more prone to damage or cracking. In some examples, instead of increasing the thickness of a single diffusion barrier layer, multiple diffusion barrier layers, each having a smaller thickness, may be used, such that diffusion of chemical species would be reduced by the substantially the same effective barrier thickness. In some examples, increasing the thickness of a single diffusion barrier layer may be difficult, because of the limitations of the process used to deposit the diffusion barrier layer, or it may be difficult to obtain a uniform thickness beyond a certain threshold thickness. For example, chemical vapor deposition or physical vapor deposition may not allow depositing a barrier having a uniform thickness beyond a certain threshold thickness. Therefore, multiple barrier layers may be deposited using different deposition stages, to arrive at a target uniform thickness. Further, to improve the mechanical compliance of the multiple barrier layers, multiple compliance layers may be disposed between adjacent barrier layers. Therefore, in some examples, joint surface coating 14c may include alternating, multiple diffusion barrier layers and compliance layers.

In some examples, an example joint surface coating may additionally include a braze compatibility layer. For example, FIG. 1D is a conceptual and schematic cross-sectional block diagram illustrating an example article 10d including substrate 12 and a joint surface coating 14d, where joint surface coating 14d includes a braze compatibility layer 30. Braze compatibility layer 30 may act as a faying surface of a braze joint and improving wetting and adherence of the braze material in the braze joint to joint surface coating 14d or to substrate 12, e.g., compared to an example that does not include braze compatibility layer 30. As such, braze compatibility layer 30 may be an outermost layer of joint surface coating 14d, with one or both of diffusion barrier layer 18 and compliance layer 16 disposed between braze compatibility layer 30 and substrate 12.

In some examples, braze compatibility layer 30 may be configured to promote wetting of joint surface coating 14d with a braze material. For example, braze compatibility layer 30 may promote substantially even flow and wetting (e.g., even flow and wetting or nearly even flow and wetting) of joint surface coating 14d across major surface 13 of substrate 12 with the braze material. In some examples, braze compatibility layer 30 may include at least one of a metal, for example, a transition metal; a metalloid; or a ceramic (e.g., at least one metal; at least one metalloid; at least one ceramic; at least one metal and at least one metalloid; at least one metal and at least one ceramic; at least one metalloid and at least one ceramic; or at least one metal, at least one metalloid, and at least one ceramic). For example, braze compatibility layer may include at least one of Mo, W, Ni, Ti, or SiC. In some examples, braze compatibility layer 30 may include at least one component that is also present in the braze material that is used to join article 10d to another article. For example, both braze compatibility layer 30 and the braze material may include the same metal, metalloid, or ceramic. In some examples, both braze compatibility layer 30 and the braze material may include silicon.

In some examples, braze compatibility layer 30 and diffusion barrier layer 18 may be the same layer, i.e., a single layer may provide the functionality of both braze compatibility layer 30 and diffusion barrier layer 18. For example, diffusion barrier layer 18 may include a layer of a ceramic material that also acts as compatibility layer 30. In some examples, the ceramic material that provides the functionality of both braze compatibility layer 30 and diffusion barrier layer 18 may include SiC. In some examples, the composition within a single layer may transition from a diffusion barrier composition to a braze compatibility composition. For example, the concentration of silicon may increase in a gradient from a region of diffusion barrier layer 18 facing substrate 12 to a region of diffusion barrier layer 18 distant from substrate 12. In some examples, a second compliance layer, for example, second compliance layer 16b of FIG. 1C, may be disposed between braze compatibility layer 30 and diffusion barrier layer 18 of joint surface coating 14d. For example, braze compatibility layer 30 may include a ceramic, and the second compliance layer may reduce or substantially prevent wear, reduce fragility, or improve integrity of braze compatibility layer 30. In some examples, the braze material may be compatible with diffusion barrier layer 18, for example, the braze material may sufficiently flow, wet and adhere to diffusion barrier layer 18, and a separate braze compatibility layer 30 may not be included.

In some examples, the respective average thicknesses of one or more layers in example joint surface coatings described with reference to FIGS. 1A-1D above may be about 10 µm, for example, 10±5 µm, or 10±1 µm. In some examples, the respective thickness of each layer in example joint surface coatings may be about 10 µm. In some examples, the thickness of example joint surface coatings may have less than a predetermined variance, for example, have a surface variance of less than about 25 to 50 µm from peak to valley.

The example articles and joint surface coatings described with reference to FIGS. 1A-1D may be prepared using any suitable technique, for example, using example techniques described with reference to FIGS. 2 and 3.

Figure 2:
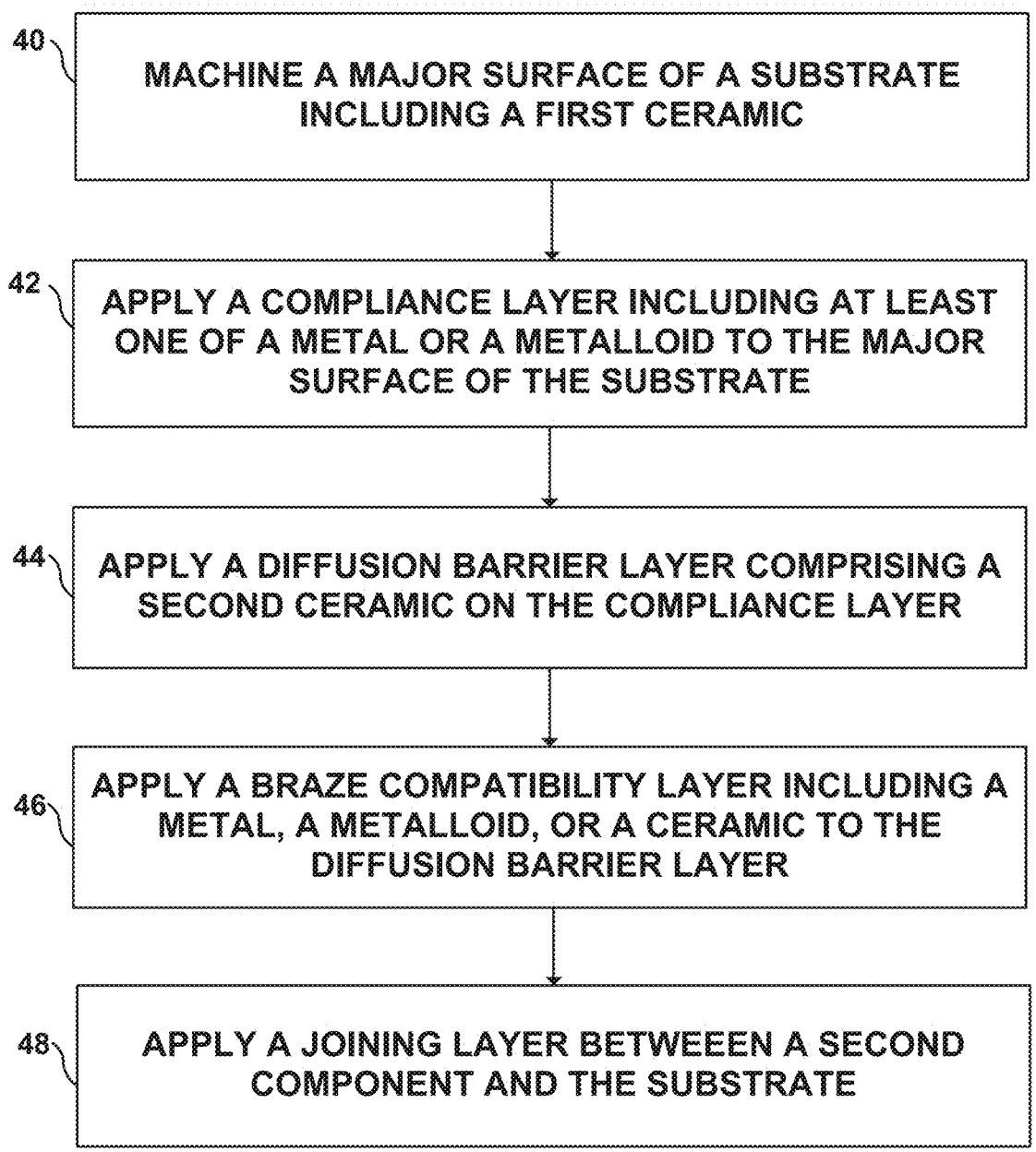
FIG. 2 is a flow diagram illustrating an example technique for applying a multilayer coating to a component.

For example, FIG. 2 is a flow diagram illustrating an example technique for applying multilayer coating 14a to a component including substrate 12. While the example technique of FIG. 2 is described with reference to article 10a of FIG. 1A, the example technique may be implemented to prepare other example articles according to the disclosure. The example technique may optionally include preparing major surface 13 of substrate 12 for coating or joining, for example, by machining major surface 13 (40). In some examples, the machining may include one or more of etching, abrading, polishing, solvent washing, and cleaning major surface 13. The example technique includes applying compliance layer 16 comprising at least one of a metal or a metalloid to major surface 14 of substrate 12 comprising a first ceramic (42). The example technique further includes applying diffusion barrier layer 18 comprising the second ceramic on compliance layer 16 (44). In some examples, the example technique may further include applying braze compatibility layer 20 comprising a metal, a metalloid, or a ceramic on diffusion barrier layer 18 (46). One or more of applying compliance layer 16, applying diffusion barrier layer 18, and applying braze compatibility layer 20 may be performed using similar or different suitable techniques for depositing a layer of a predetermined composition having a predetermined thickness, for example, one or more of chemical vapor deposition (CVD), physical vapor deposition (PVD), sputtering, plasma spraying, electron-beam deposition, and directed energy deposition.

In some examples, the example technique may optionally further include joining second component 26 to substrate 12 by applying joining layer 22 between the component and the substrate (48). For example, joining layer 22 may be applied by welding, or by brazing, as described with reference to the example technique of FIG. 3. FIG. 3 is a flow diagram illustrating an example technique for joining coated component 10 to second component 26.

Figure 3:
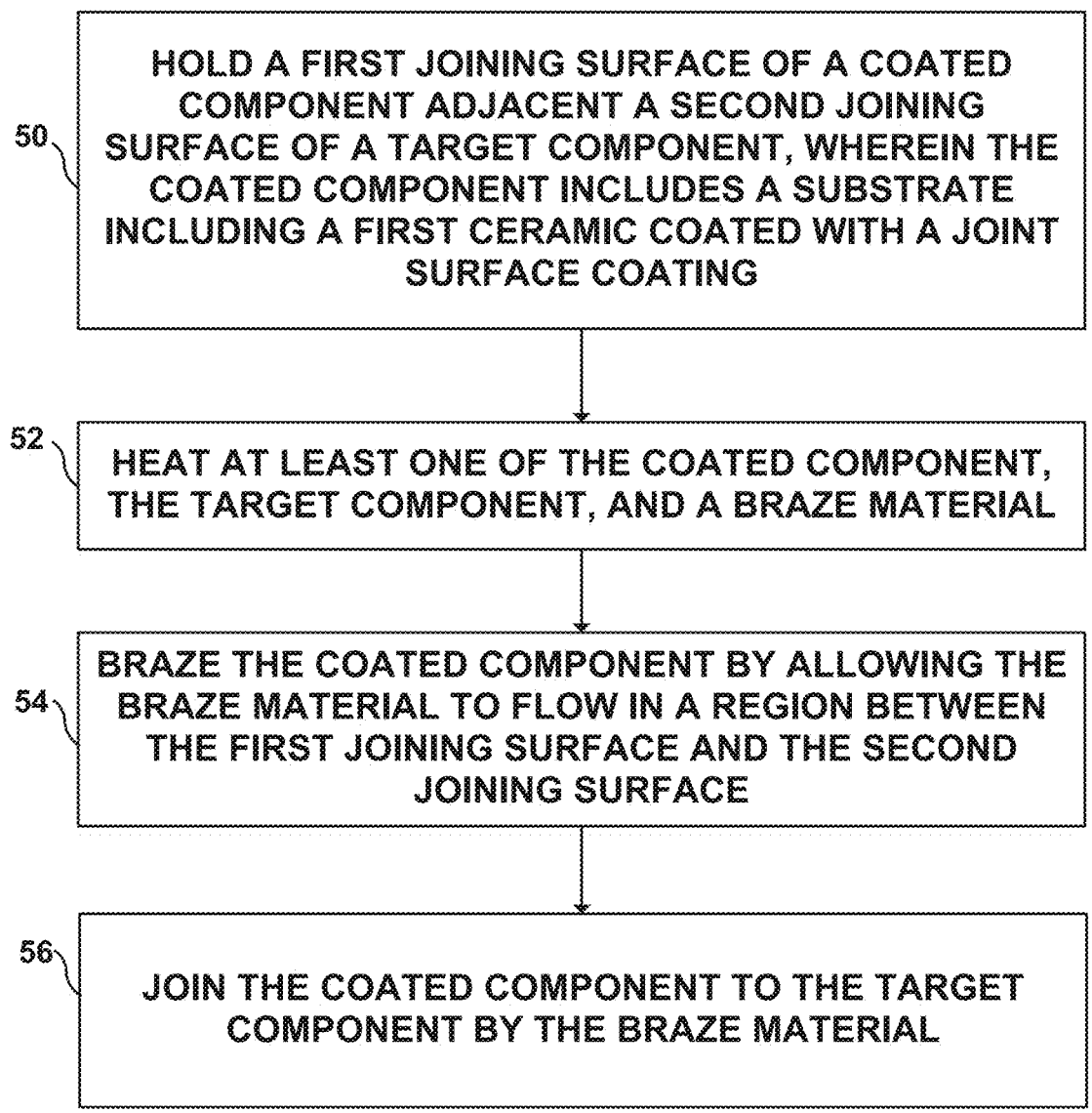
FIG. 3 is a flow diagram illustrating an example technique for joining a coated component to a second component.

The example technique of FIG. 3 includes positioning first joining surface 24 of coated component 10 adjacent second joining surface 28 of second component 26 (50). For example, first and second joining surfaces 24 and 28 may be positioned to define a joining region that will be occupied by the braze material. The example technique may include heating at least one of coated component 10, second component 26, and a braze material (52). For example, a braze heat source may be configured to generate energy to heat one or more of coated component 10, second component 26, and the braze material to a temperature sufficiently high to fuse or melt the braze material. Depending on the composition of the braze material. For example, the heating may result in a temperature of greater than 700° C., or greater than 1000° C., or greater than 1200° C., or greater than 1400° C. The temperature may be controlled to be within an upper range that may depend on the composition of one or more of coated component 10, second component 26, and the braze material. For example, a maximum temperature may be less than 1500° C., or less than 1400° C., or less than 1200° C., or less than 1000° C. In some examples, one or more of coated component 10, second component 26, and the braze material may be preheated, postheated or both, for example, to plastically relieve stress by microcracking, grain boundary sliding or softening, dislocation motion, twinning, grain growth, recrystallization, or the like.

The example technique of FIG. 3 also may include brazing coated component 10 by allowing the braze material to flow in a region between first joining surface 24 and second joining surface 28 (54). For example, fused or molten braze material may flow or infiltrate into the joining region between first and second joining surfaces 24 and 28 by capillary action, wicking, surface tension, or other physical forces. In some examples, braze material may be positioned in the region between first joining surface 24 and second joining surface 28, and subsequently allowed to melt or soften to flow in the region. After the flowing, the braze material may solidify to form a solid joining layer 22. For example, the example technique may include solidifying braze material to join second component 26 to coated component 10 (56).

While the example techniques described with reference to FIGS. 2 and 3 may be used to prepare example articles described with reference to FIGS. 1A-1D, the example techniques may be used to prepare any example articles according to the disclosure. Thus, example articles and techniques are described for providing joint surface coatings on a substrate to be joined to a second component. The joint surface coatings may promote the joining and act as barriers to the diffusion of chemical species between the substrate and the second component, while being mechanically compliant to resist stresses that may result from thermal or mechanical cycling.

EXAMPLES

Example 1

Figure 4:
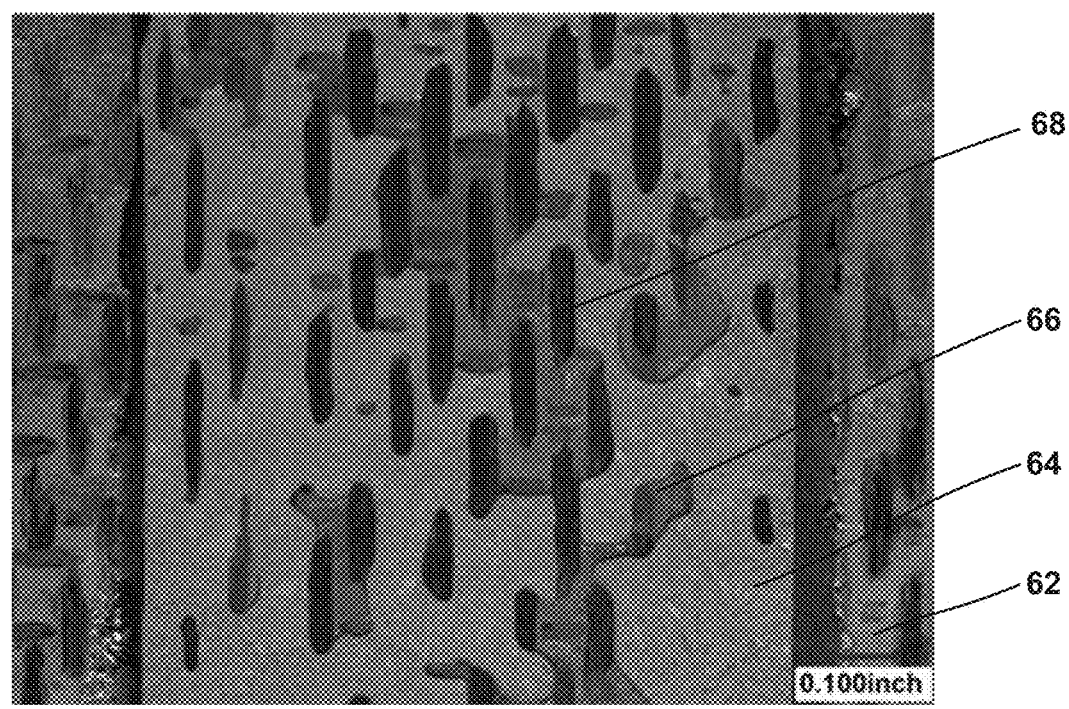
FIG. 4 is a photograph illustrating an uncoated CMC surface having uneven brazing.

FIG. 4 is a photograph illustrating an uncoated CMC surface having uneven brazing. A CMC substrate 62 was machined, and brazed with a silicon-based alloy braze 64. No CMC substrate 62 was not coated before being brazed with braze 64. Regions such as region 66 exhibited uneven flow of braze 64 on the brazed surface of CMC substrate 62 by braze 64. Regions adjacent fiber tows 68 also exhibited uneven flow of braze 64.

Example 2

Figure 5:
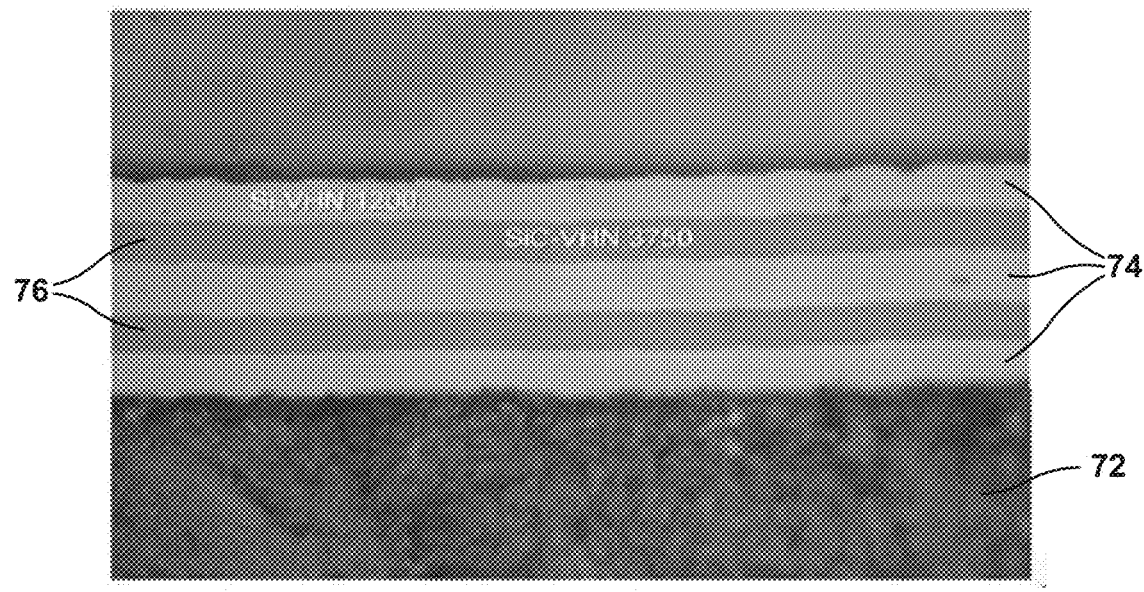
FIG. 5 is a micrograph illustrating a cross-section of an example multilayer coating on a silicon carbide substrate.

FIG. 5 is a micrograph illustrating a cross-section of an example multilayer barrier coating on a silicon carbide substrate 72. Alternating silicon layers 74 (compatibility layers) and silicon carbide layers 76 (anti-diffusion barrier ceramic layers) were deposited on the silicon carbide substrate 72 by chemical vapor deposition. The Vickers Hardness Number (VHN) for each layer was established by microhardness indentation. The Vickers Hardness Number of the respective silicon layers 74 and silicon carbide layers 76 was found to be 1200 and 3750, confirming the presence of silicon and silicon carbide in the respective layers.

Various examples have been described. These and other examples are within the scope of the following claims.

The invention claimed is:

1. An article comprising:
   a component;
   a substrate comprising a first ceramic;
   a braze or weld layer between the component and the substrate; and
   a joint surface coating between the substrate and the braze or weld layer; wherein the joint surface coating comprises:
      a first diffusion barrier layer comprising a second ceramic material,
      a first compliance layer comprising at least one of a metal or a metalloid, wherein the first compliance layer is a continuous layer on an outer surface of the substrate between the first diffusion barrier layer and the substrate,
      a second diffusion barrier layer comprising a third ceramic; and
      a second compliance layer comprising at least one of a metal or a metalloid, the second compliance layer being between the first diffusion barrier layer and the second diffusion barrier layer,
      wherein the at least one of the metal or the metalloid of the second compliance layer is different than the at least one of the metal or the metalloid of the first compliance layer.

2. The article of claim 1, wherein the braze or weld layer comprises the braze layer, the braze layer comprising a braze material.

3. The article of claim 2, wherein the braze material comprises a silicon alloy.

4. The article of claim 1, wherein the substrate comprises a ceramic matrix composite.

5. The article of claim 1, wherein the first compliance layer comprises silicon.

6. The article of claim 1, wherein the first compliance layer consists essentially of silicon.

7. The article of claim 1, wherein the first diffusion barrier layer comprises silicon carbide.

8. The article of claim 1, wherein the first diffusion barrier layer consists essentially of silicon carbide.

9. The article of claim 1, wherein the first diffusion barrier layer is configured to inhibit the diffusion of at least one of SiC, $Si_3N_4$, or WC between the substrate and the braze or weld layer.

10. The article of claim 1, further comprising a braze compatibility layer on the second diffusion barrier layer, wherein the braze compatibility layer comprises at least one of a metal, a metalloid, or a ceramic, wherein the braze compatibility layer is configured to promote wetting of the joint surface coating with a braze material.

11. The article of claim 10, wherein the braze compatibility layer comprises one or more of Mo, W, Ni, Ti, or SiC.

12. A method comprising:
   holding a first joining surface of a coated component comprising a substrate adjacent a second joining surface of a second component, wherein the substrate comprises a first ceramic coated with a joint surface coating, wherein the joint surface coating comprises a first diffusion barrier layer, a first compliance layer, a second diffusion barrier layer, and a second compliance layer, wherein the first diffusion barrier layer comprises a second ceramic, wherein the first compliance layer comprises at least one of a metal or a metalloid, wherein the first compliance layer is a continuous layer on an outer surface of the substrate between the first diffusion barrier layer and the substrate, wherein the second compliance layer is between the first diffusion barrier layer and the second diffusion barrier layer;
   wherein the second diffusion barrier layer comprising a third ceramic, wherein the second compliance layer comprises at least one of a metal or a metalloid, wherein the at least one of the metal or the metalloid of the second compliance layer is different than the at least one of the metal or the metalloid of the first compliance layer;
   heating at least one of the coated component, the second component, and a braze material; and
   brazing the coated component by allowing the braze material to flow in a region between the first joining surface and the second joining surface.

13. The article of claim 1, wherein the first compliance layer has a uniform thickness on the outer surface of the substrate.

14. The article of claim 13, wherein the first compliance layer is directly on the outer surface of the substrate.

15. The article of claim 1, wherein the component comprises at least one of a metal substrate, a glass substrate, a polymer substrate, a ceramic substrate or a ceramic matrix composite substrate, and wherein the braze or weld layer is directly adjacent the metal substrate, the glass substrate, the polymer substrate, the ceramic substrate or the ceramic matrix composite substrate.

16. The article of claim 1, wherein the third ceramic of the second diffusion barrier layer is the same as the second ceramic of the first diffusion barrier layer.

\* \* \* \* \*